United States Patent [19]
Williams et al.

[11] Patent Number: 5,244,399
[45] Date of Patent: Sep. 14, 1993

[54] METER SOCKET PROTECTOR

[75] Inventors: Danny R. Williams, Pearland; Tobe W. Williams, Huffman, both of Tex.

[73] Assignee: Houston Industries Incorporated, Houston, Tex.

[21] Appl. No.: 930,341

[22] Filed: Aug. 14, 1992

[51] Int. Cl.⁵ .......................................... H01R 13/44
[52] U.S. Cl. .................... 439/146; 439/508; 439/912
[58] Field of Search ............... 439/146, 147, 508, 912; 174/66

[56] References Cited

U.S. PATENT DOCUMENTS

| | | | |
|---|---|---|---|
| 1,028,254 | 6/1912 | Murray | 324/74 |
| 1,721,775 | 7/1929 | Fallon | 174/66 |
| 2,218,650 | 10/1940 | Larson | 324/74 |
| 2,249,075 | 7/1941 | Young et al. | 324/74 |
| 2,255,122 | 9/1941 | Markley | 324/74 |
| 2,752,413 | 6/1956 | Junkins | 174/67 |
| 3,029,322 | 4/1962 | Waldrop | 439/508 |
| 3,441,656 | 4/1969 | Selden et al. | 174/50 |
| 3,591,835 | 6/1971 | Sloop | 317/109 |
| 3,599,134 | 8/1971 | Galloway | 336/90 |
| 3,683,102 | 8/1972 | Moran et al. | 324/110 |
| 3,806,857 | 4/1974 | Hubeny | 439/508 |
| 3,841,032 | 10/1974 | Grannis | 174/50 |
| 3,868,040 | 2/1975 | Langmack, Jr. | 174/50 |
| 3,997,840 | 12/1976 | Pearson | 324/156 |
| 4,080,570 | 3/1978 | Pearson | 324/156 |
| 4,121,147 | 10/1978 | Becker et al. | 324/157 |
| 4,271,390 | 6/1981 | Canu | 324/74 |
| 4,326,395 | 4/1982 | Derosa | 174/66 |
| 4,404,521 | 9/1983 | Fennell | 324/110 |
| 4,556,844 | 12/1985 | Wason | 324/156 |
| 4,559,699 | 12/1985 | Owen et al. | 174/50 |
| 4,583,043 | 4/1986 | Phillips | 324/110 |
| 4,747,016 | 5/1988 | Sloop, Sr. | 361/364 |
| 4,973,797 | 11/1990 | Jorgensen et al. | 174/53 |
| 5,006,076 | 4/1991 | Robinson et al. | 439/146 |
| 5,145,403 | 9/1992 | Schaffert et al. | 439/146 |

*Primary Examiner*—Paula A. Bradley
*Attorney, Agent, or Firm*—Pravel, Hewitt, Kimball & Krieger

[57] ABSTRACT

A protector formed of a suitable dielectric material is adapted to be inserted into an electrical utility meter box socket. The protector is provided to insulate energized terminals in the meter box from each other and from any ground potential. The protector serves as a temporary insulative barrier greatly reducing the risk of injury to service crew members taking voltage readings or verifying phase rotation.

23 Claims, 4 Drawing Sheets

METER SOCKET PROTECTOR

BACKGROUND OF THE INVENTION

1. Field of Invention

The present invention relates to protective inserts for electrical utility meter sockets.

2 Description of Prior Art

In electrical power distribution, it has been common practice for service crew members to take electrical measurements or readings from terminals in electrical meter boxes. Voltage readings or phase rotation indications are examples of these types of measurements. There has been a possibility of injury, since the crew member was working with energized terminals. An inadvertent short circuit could possibly be formed between two energized terminals, or an energized terminal could be mistakenly shorted to ground.

There have been several types of meter testing jacks in the prior art. Examples are U.S. Pat. Nos. 2,218,650; 2,225,122 and 1,028,254. These have been generally relatively simple, panel or board-like items with a set of blades on one side for insertion into the jaws within the meter box. A corresponding set of spring contacts or jaws for test connections was provided on an opposite side of the panel in electrical contact with the insertion blades. One problem with this type of structure was that test connections were difficult to make with the spring contacts, since the contacts were designed to receive and connect with the meter blades. Also, in testing electrical power lines at meter boxes, one set of terminals, termed the line side, was electrically energized. The other set of terminals, known as the load side, could have an inadvertent short between terminals. There was thus a need for some capability to separate testing connections between the line side and the load side.

Other prior art patents provided inserts, also termed adapters or extenders, which were adapted to be connected by blades on one side inserted into the meter box jaws. These types of inserts were used for testing of various functions, such as watt hour meter testing or testing for energy diversion, or for connection of tamper proofing structures. Patents in this category included U.S. Pat. Nos. 4,583,043; 4,404,521; 4,121,147; 4,271,390; and 2,249,075.

SUMMARY OF INVENTION

Briefly, the present invention provides a new and improved protective insert for an electrical utility meter box socket. The protective insert according to the present invention takes the form of a plate member of dielectric material and of a shape conforming to the meter box socket. Electrical connector blades are mounted with the plate member on a first or inner side for insertion into connection with spring contacts of jaws in the meter box, usually the line or energized side connected to the incoming power lines.

Electrical contact bodies are also mounted with the plate member on a second side for contact by testing instrument connectors. The electrical contact bodies are electrically connected through the plate member to the connector blades. A suitable number of openings are also formed in the plate member for passage of test probes through the plate member for contacting spring contacts or jaws in the meter box, usually on the load or de-energized side, so that tests for short circuits, electrical grounds and the like can be made.

A divider wall is formed on the plate member to separate the electrical contact bodies from the openings in the plate member. This separates the connections usually made with the line side of the meter box for testing from the connections made with the line side during testing. The protective insert provides increased protection and safety for service crew members when taking electrical measurements or readings from terminals in electrical meter boxes.

DESCRIPTION OF PREFERRED EMBODIMENT

Figure 1:
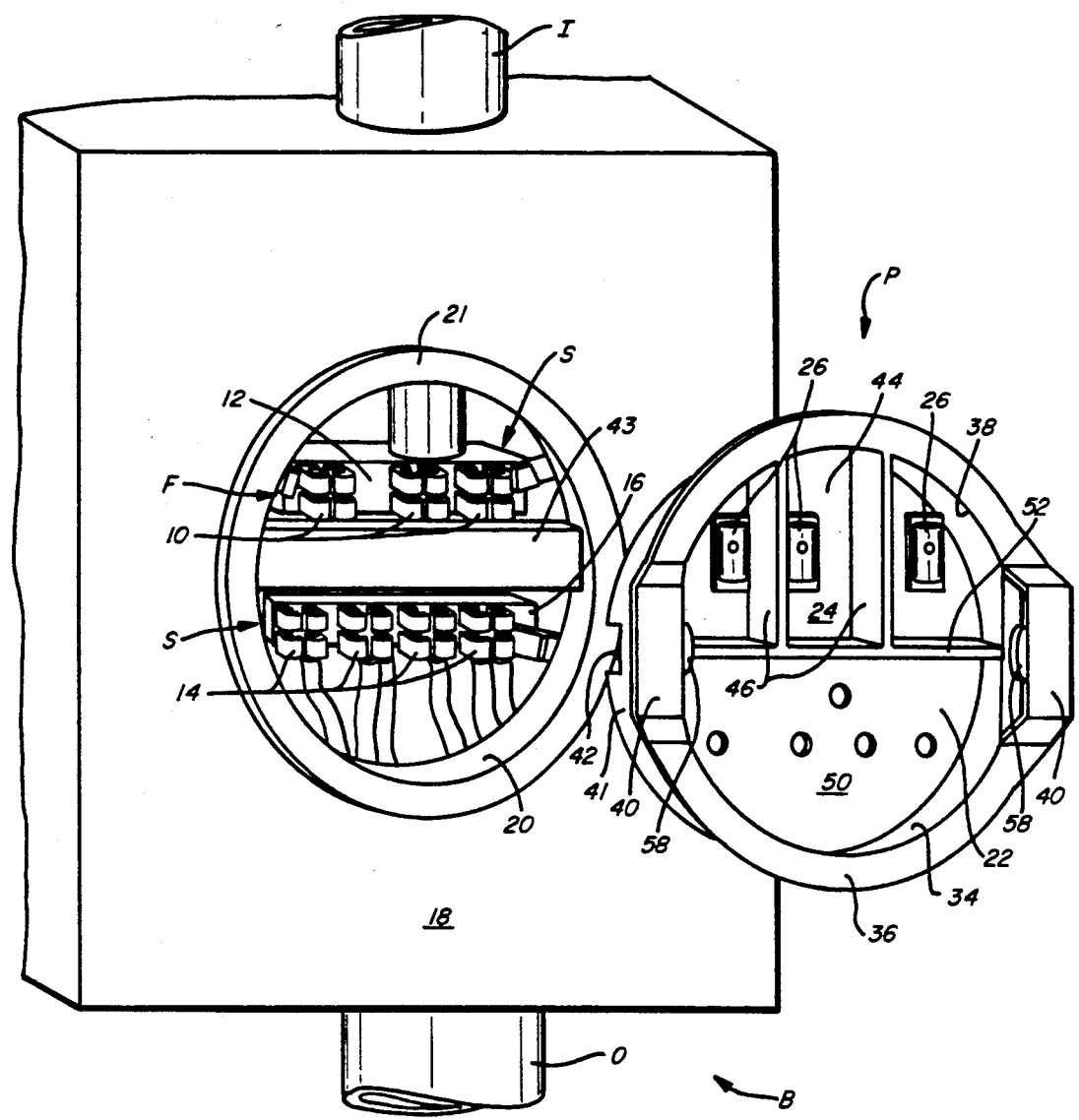
FIG. 1 is an isometric view, partly exploded, of a protective insert according to the present invention removed from a socket in an electrical utility meter box.

In the drawings, the letter P designates generally a protective insert for a socket S in an electrical utility meter box B. The electrical meter box B is a protective covering which encloses a first set F of spring contacts or jaws electrically connected to receive incoming electrical power through electrical conductors in an inlet conduit I. The first set F of jaws are usually referred to as the live side since they are usually connected to live electrical power.

The meter box B also includes a second set S of spring contacts or jaws electrically connected through conductors in an outlet conduit 0 to electrical loads. For this reason, the second set of jaws S is commonly referred to as the load side or line side.

The meter box B is of conventional construction and may be of any suitable type, such as for example that shown in U.S. Pat. No. 5,039,936 owned by the assignee of the present application. The meter box B in FIG. 1 has three sets of spring contacts or jaws 10, one for each phase of incoming electrical power, in the first set F mounted on an insulative bar 12. Each of the live side jaw sets 10 is in electrical connection with a corresponding one of three incoming electrical conductors in the conduit I. The second set S of spring contacts in the meter box B includes four sets of spring contacts or jaws 14, one for each phase on the line side. Each of these three sets of jaws 14 is mounted on an insulative bar 16 and is electrically connected by conductors in the outlet conduit O to the load side. The final or fourth set of load side jaws 14 is for an electrical ground and is electrically connected by a suitable conductor to such ground.

The socket S of the meter box B is formed in a central location of a front panel 18 and is surrounded by a collar 20 and a flange 21. In normal situations, a watthour meter is inserted into the socket S so that blades on the meter may form electrical connections between the sets of contacts S and F. In this way, the meter can measure and indicate the amount of electrical power flowing through the conduits in the meter box B to a user.

Before a user is electrically connected for service by an installation crew, it is necessary to check for proper connection and flow of electrical power between the inlet and outlet conduits of the box B. It is also necessary at various times during service life to remove the watthour meter and make electrical measurements and readings.

The protective insert P is used in situations where it desired to test either of both of the live side and the load side of electrical connections through the meter box B. Examples of tests which may be performed include voltage readings, ground or short circuit checks, and phase rotation verification. Other tests are also made from time to time.

Considering the protective insert P more in detail, a cover plate member 22 of a suitable insulative dielectric material of a generally circular shape conforming to the configuration of the meter box socket S is adapted for insertion into the socket S. A set of conventional electrical connector blades, like those on conventional watthour meters are formed on a first or rear face opposite to a second generally flat or plane front face 24 of the cover plate member 22. The connector blades are equal in number to and spaced so as to fit into the jaws 10 in the first contact set F.

A set of electrical contact bodies 26 are located on the front face 24 of the cover plate member 22. The electrical contact bodies 26 are aligned with the electrical connector blades on the rear face of the cover plate member 22. The electrical contact bodies 26 are each aligned and electrically connected to a corresponding one of the connector blades on the opposite side of the cover plate member 24.

Figure 3:
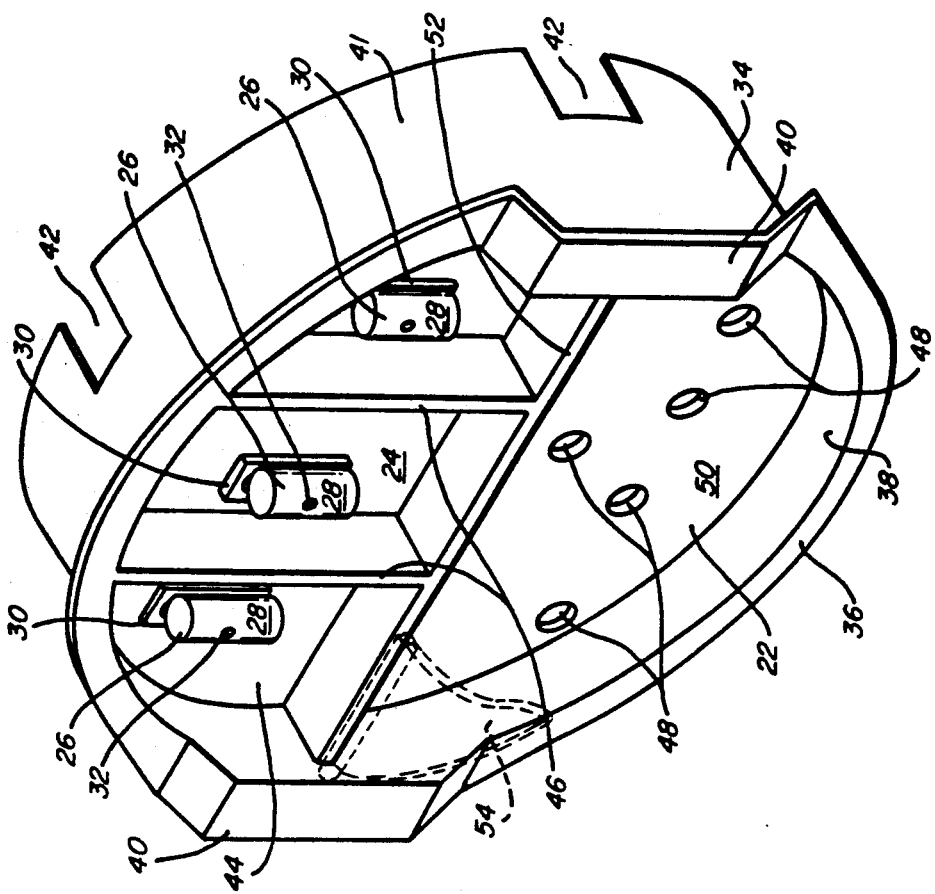
FIG. 3 is an isometric view of the protective insert of FIG. 1.

Each of the electrical contact bodies 26 is an electrically conductive body member having a curved outer or contact surface 28 (FIG. 3) which is engagable by being gripped by contact jaws, such as those commonly termed alligator jaws, of electrical test connectors of electrical measuring or testing equipment. The electrically conductive body members 26 are in the preferred embodiment generally cylindrical conductive rod members and extend outwardly from mounting plates 30 on the plane front surface 24. The conductive body members 26 also extend transversely along the plane front surface 24 of the plate member 22. In this manner, the electrically conductive body members 26 can be readily gripped by contact jaws of electrical test connectors.

The conductive body members 26 also have test sockets 32 drilled or otherwise formed into them at suitable locations. The test sockets 32 are adapted to receive therein contact probes or fingers of electrical test connectors. The test sockets 32 also are formed sloping slightly downwardly into the conductive body members 26. In this manner, once an instrument contact probe has been inserted into the test socket 32, it will be retained in place, freeing a service crew member's hands which would otherwise be required to hold it in place.

The plate member 22 further has a generally cylindrical skirt or collar 34 formed about the front surface 24 which extends outwardly beyond the conductive body members 26. A generally flat circular outer rim 36 extends about an outer end 38 of the collar 32 over a considerable portion of the circumference of collar 32.

A pair of raised grip handles 40 are formed on rim 36 extending outwardly at generally diametrically opposite locations on sides of the protective insert P. The grip handles 40 permit a service crew member to firmly grasp the protective insert P so that the connector blades on the rear surface can be forced into the first set F of contacts within the meter box B. The grip handles 40 also serve as a convenient gripping point for a service crew member in removing the insert P from the meter box B.

The skirt 34 extends rearwardly as indicated at 41 from the plate member 22 a generally corresponding distance to its outward extent. In this manner, the skirt 34 fits within the collar 20 of the meter box B before electrical connection is made between the connector blades on the plate member 22 and the jaws 10. The skirt 34 thus functions as a protective flash barrier. The skirt 34 further has a suitable number of generally rectangular slots or notches 42 formed in its rear portion. The slots 42 are provided to fit onto tamper bars when the meter box B has such tamper bars, such as shown at 43. The tamper bar 43 may be located to extend either vertically of horizontally. This type of tamper bar is conventional and is shown, for example, in U.S. Pat. No. 4,404,521.

On an upper portion 44 of the front face 24 of the cover plate member 22 between adjacent ones of conductive body members 26 are a pair of raised generally vertically extending partition walls 46. The partition walls 46 are formed of insulative or dielectric material and serve as walls or barriers to protect against service crew members inadvertently electrically bridging test connections between adjacent connective body members 26 during testing.

A number of openings or ports 48 are also formed on a lower portion 50 of the front face 24 extending through the cover plate member 22. The openings 48 are located at positions aligned with the jaws 14 in the second set S so that service crew members may make test connections. A raised divider 52 is formed extending transversely to partition walls 46 across a central portion of the front face 24 of the cover plate member 22 between the upper portion 44 and the lower portion 50. The divider 52 serves to protect against inadvertent connection or contact between the line side and the live side by test instruments when they are being connected for test purposes through the insert P into the meter box B.

Figure 2:
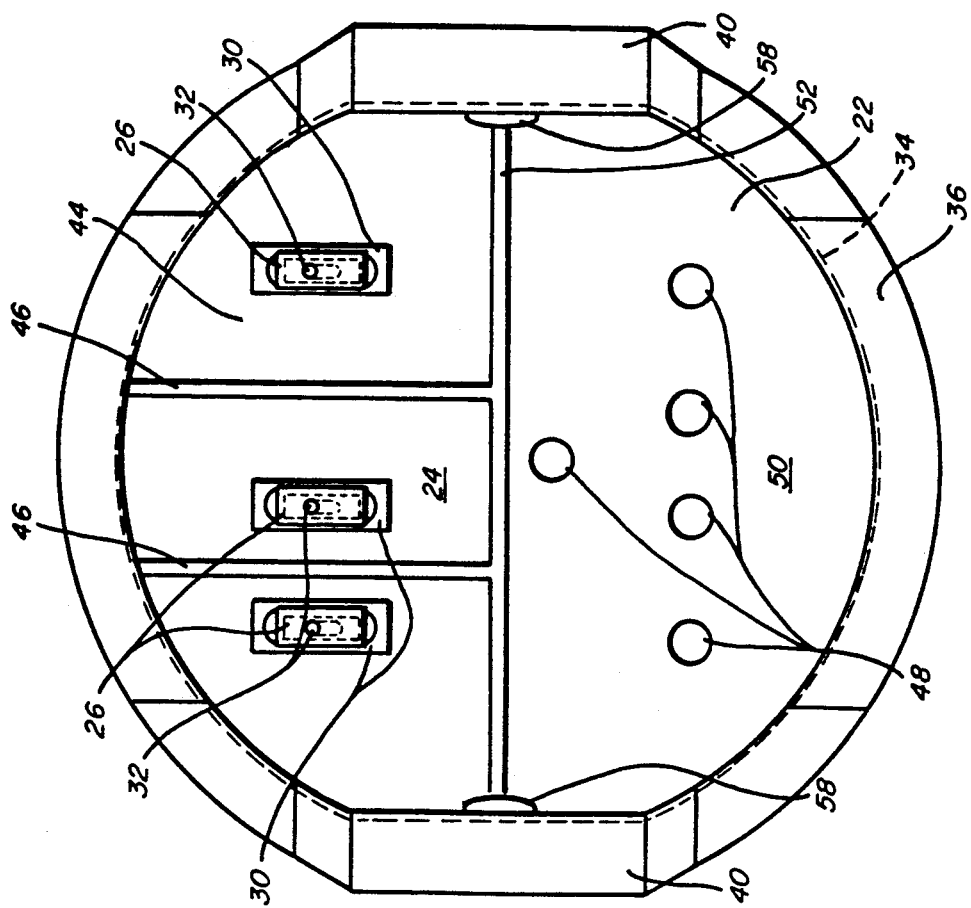
FIG. 2 is an elevation view of the protective insert of FIG. 1.
Figure 4:
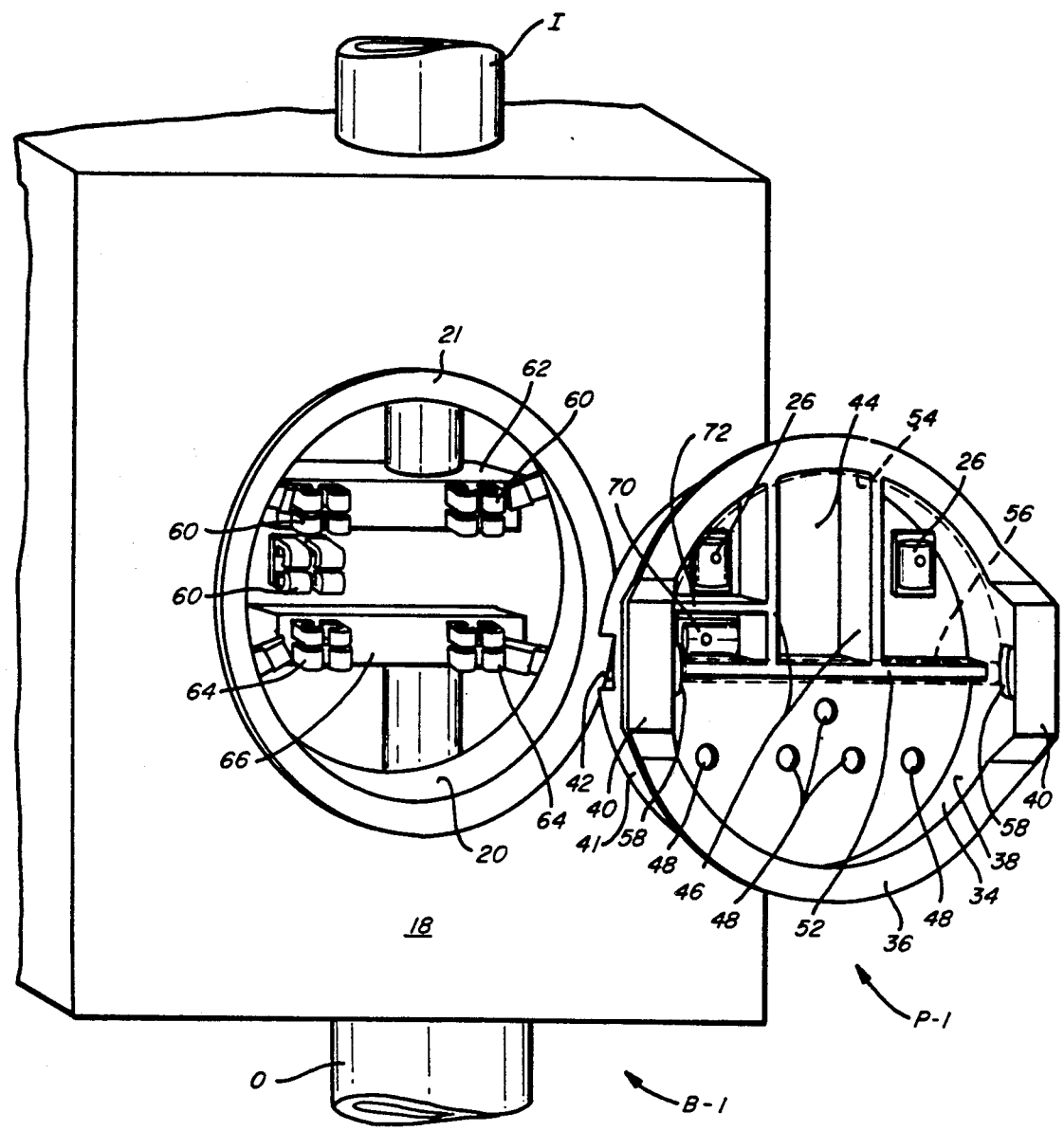
FIG. 4 is an isometric view, partly exploded, of an alternate protective insert according to the present invention removed from a meter box socket.
Figure 6:
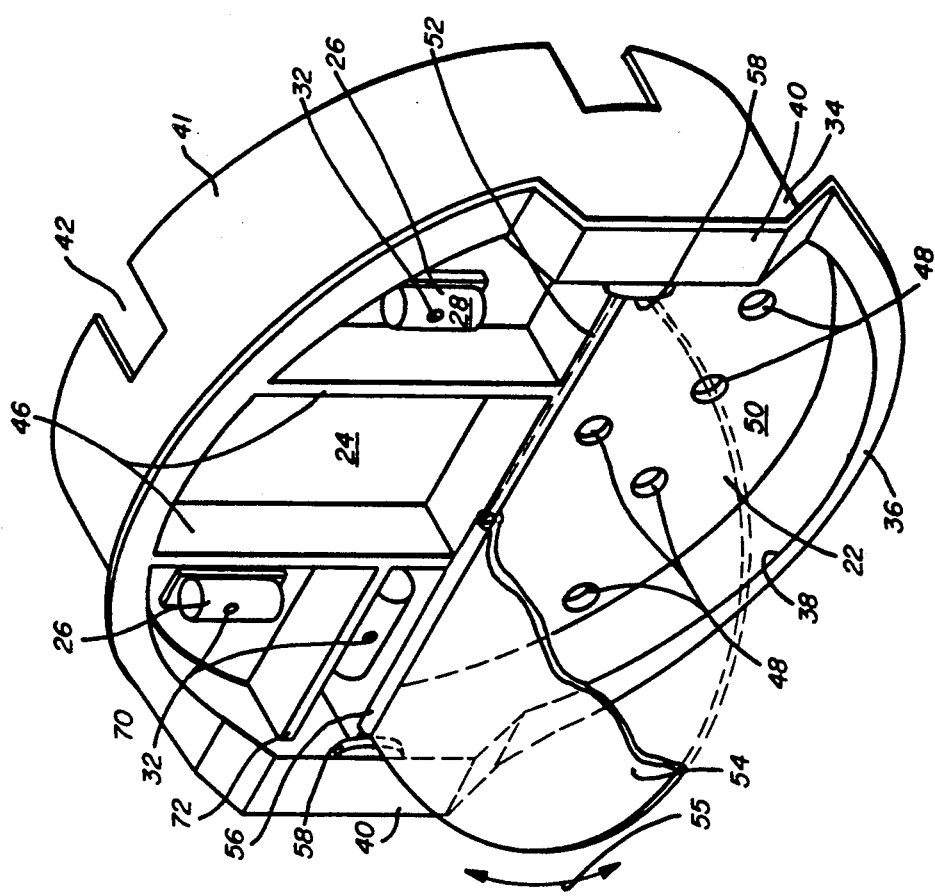
FIG. 6 is an isometric view of the protective insert of FIG. 4.
Figure 5:
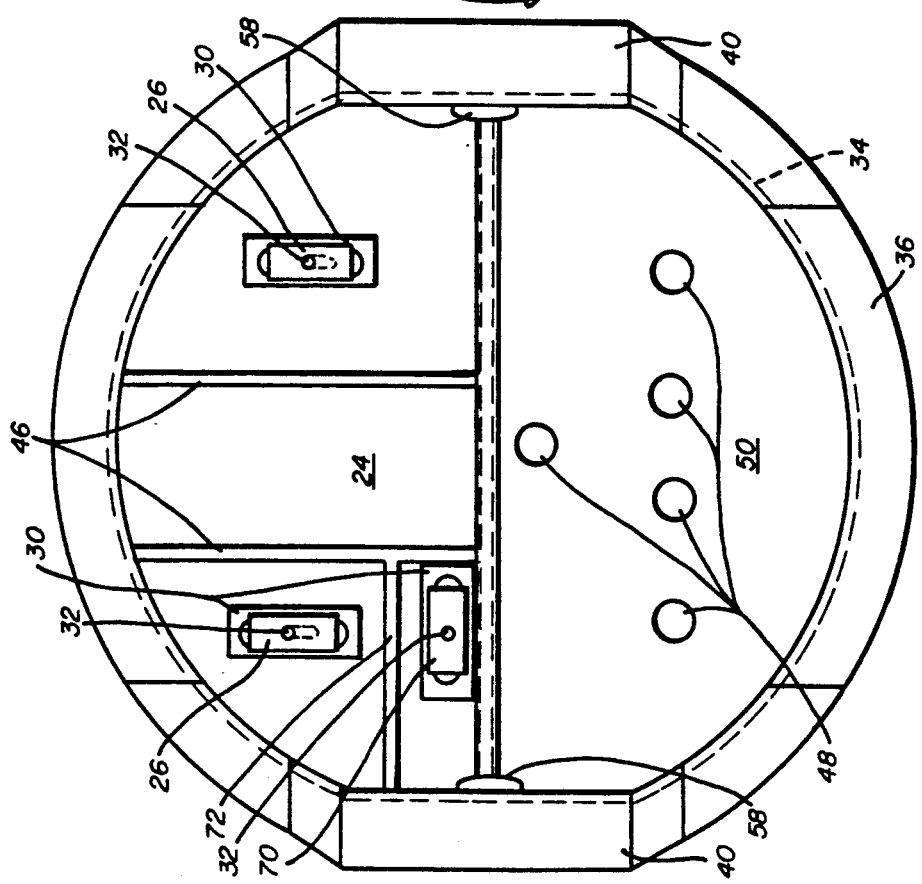
FIG. 5 is an elevation view of the protective insert of FIG. 4.

It is also in some instances desirable to effectively separate or isolate the upper portion 44 and the lower portion 50 of the protective insert P during electrical testing. For these situations, the protective insert P may be provided with a pivotable, semi-circular front flap 54. The front flap 54 is shown only in partly broken away form in phantom in FIG. 3. The front flap 54 is not otherwise shown in FIGS. 1-3 so that other structure of the protective insert P may more clearly be seen. It should be understood that the front flap 54 may be used with the embodiment shown in FIGS. 1-3. Details of the front flap 54 are shown in FIGS. 4-6.

The front flap 54 is also formed of a suitable insulative or dielectrical material, as is the plate member 22. The front flap 54 is pivotally mounted along a pivot sleeve 56 extending along the divider 52.

The front flap 54 is a semi-circular disc member generally equal in surface area to one-half of the cover plate member 22 and may be pivoted upwardly or downwardly as indicated by an arrow 55. The flap 54 may thus be located in any one of three alternative positions. For example, the front flap 54 may be mounted in an upper position shown in phantom covering the upper portion 44 (FIG. 4) and the therefore the conductive body members 26. The front flap 54 may also be pivoted downwardly to a lower position opposite that shown in phantom in FIG. 4 covering the lower portion 50 of the cover plate member 22 and thus the openings 48. The front flap 54 may also be moved to a central or intermediate position (FIG. 6). Only a portion of the semi-circular flap 54 is shown in FIG. 6 so that other structure may more clearly be seen. In the intermediate position, the front flap 54 serves as an extension of the divider 52, while permitting simultaneous access to both the conductive body members 26 and the openings 48.

The grip handles 40 have inwardly extending stop detents or tabs 58 formed on inner portions. The detents 58 are adapted to engage the flap 54 and hold it by frictional engagement in the desired one of the three operating positions.

An alternative protective insert P-1 (FIGS. 4–6) is adapted for use with a meter box B-1 which has a pair of upper jaw sets 60 mounted on an insulative bar 62 and connected to incoming conductors from the line side. The box B-1 has on the load side a pair of lower jaw sets 64. The jaw sets 64 are mounted on an insulated bar 66 and connected to outlet conductors. A fifth set of spring contacts of jaws 68 is also provided in the box B-1 for electrical connection. The box B-1 thus has five sets of conductive spring contacts or jaws therein rather than the more usually prevalent seven shown in the meter box B. In the protective insert P-1 and the meter box B-1, like structure performing like functions bears like reference numerals.

A generally horizontally extending conductive body member 70 is provided on the protective insert P-1. The conductive body member 70 is electrically connected to a corresponding blade member adapted to be inserted into the jaw set 68 in the member box B-1. The conductive body member 70 is otherwise of like structure and operation to the other conductive body members 26. A generally horizontal partition wall 72 is formed in an upper left portion of plate insert P-1 between conductive body members 26 and 70. The partition wall 72 is generally parallel to the divider wall 52 and transverse to partition wall 46.

In the operation of the present invention, the protective insert, whether P or P-1, may be easily installed by a service crew member. The grip handles 40 may be firmly grasped so that the crew member can force the blades on the rear of plate member 22 into the line side jaws in the meter box. As has been set forth, the skirt 34 functions as a flash barrier during installation and removal of the protective insert.

Once the protective insert is in place, the crew member can take electrical readings or perform electrical tests on either the line side or the load side, or both, as desired. The partition walls 46 and 72 and divider 52 provide separation and protection against inadvertent bridging or contact between adjacent contact points. Where the protective insert is provided with front flap 54, further separation and protection may also be achieved. After the electrical testing has been completed, the protective insert can then be easily removed.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A protective insert for an electrical utility meter box socket, comprising:
   a plate member of dielectric material and of a shape conforming to the meter box socket;
   electrical connector blades mounted with said plate member on a first side thereof for insertion into spring contacts in the meter box;
   electrical contact bodies mounted with said plate member on a second side for contact by test instrument connectors and being in electrical connection with said connector blades;
   a plurality of openings formed in said plate member for passage of test probes therethrough; and
   a divider wall formed on said plate member separating said electrical contact bodies from said plurality of openings.

2. The protective insert of claim 1, wherein said electrical contact bodies comprise:
   conductive body members formed extending outwardly from said second side of said plate member.

3. The protective insert of claim 1, wherein said electrical contact bodies comprise:
   conductive body members having curved contact surfaces engagable by contact jaws of electrical test connectors.

4. The protective insert of claim 1, wherein said second side of said plate member has a generally plane surface, and wherein said electrical contact bodies comprise:
   conductive body members formed extending outwardly from said plane surface of said second side of said plate member.

5. The protective insert of claim 1, wherein said electrical contact bodies comprise:
   conductive cylindrical body members formed extending outwardly from said second side of said plate member.

6. The protective insert of claim 1, wherein said second side of said plate member has a generally planar surface, and wherein said electrical contact bodies comprise:
   conductive cylindrical rod members formed extending transversely to said planar surface of said second side of said plate member.

7. The protective insert of claim 1, wherein said electrical contact bodies comprise:
   conductive body members formed extending outwardly from said second side of said plate member and having test sockets formed therein for receiving contact probes of electrical test connectors.

8. The protective insert of claim 1, wherein the meter box socket is a round opening and wherein:
   said plate member is a round disc of dielectric material.

9. The protective insert of claim 1, further including:
   a rim of dielectric material formed about an outer portion of said plate member on said second side thereof.

10. The protective insert of claim 9, further including:
    grip means formed on said rim for allowing a service crew member to grasp the protective insert.

11. The protective insert of claim 1, further including:
    grip means formed extending outwardly from said plate member for allowing a service crew member to grasp the protective insert.

12. The protective insert of claim 1, further including:

a collar of dielectric material formed extending rearwardly from an outer portion of said plate member on said first side thereof.

13. The protective insert of claim 12, wherein the meter box has a locking flange with a cross bridge mounted in the meter box socket further including:
alignment slots formed in said collar for registry with the cross bridge of the locking flange assembly as an insertion guide.

14. The protective insert of claim 1, further including:
partition walls formed on said plate member separating said electrical contact bodies.

15. The protective insert of claim 1, further including:
a cover member movably mounted with said divider wall for covering said electrical contact bodies.

16. The protective insert of claim 15, wherein:
said cover member is movable between a first position covering said electrical contact bodies and a second position covering said plurality of openings.

17. The protection insert of claim 16, wherein:
said cover member is movable to an intermediate position between the first and second positions allowing access to both said electrical contact bodies and said plurality of openings.

18. The protective insert of claim 17, further including:
stop means for holding said cover member in the intermediate position.

19. A protective insert for an electrical utility meter box socket, comprising:
a plate member of dielectric material and of a shape conforming to the meter box socket;
electrical contact bodies mounted on said plate member for contact by test instrument connectors;
a plurality of openings formed in said plate member for passage of test probes therethrough;
a divider wall formed on said plate member separating said electrical contact bodies from said plurality of openings; and
a cover member movably mounted with said divider wall for covering said electrical contact bodies.

20. The protective insert of claim 19, further including:
partition walls formed on said plate member separating said electrical contact bodies.

21. The protective insert of claim 19, further including:
said cover member is movable between a first position covering said electrical contact bodies and a second position covering said plurality of openings.

22. The protective insert of claim 21, wherein:
said cover member is movable to an intermediate position between the first and second positions allowing access to both said electrical contact bodies and said plurality of openings.

23. The protective insert claim 22, further including:
stop means for holding said cover member in the intermediate position.

* * * * *